United States Patent
May (10) Patent No.: US 11,248,156 B2
(45) Date of Patent: Feb. 15, 2022

(54) BOREHOLE FLUID WITH A THIAMINE-BASED SHALE INHIBITOR

(71) Applicant: Halliburton Energy Services, Inc., Houston, TX (US)

(72) Inventor: Preston Andrew May, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 15 days.

(21) Appl. No.: 16/588,355

(22) Filed: Sep. 30, 2019

(65) Prior Publication Data

US 2021/0095179 A1    Apr. 1, 2021

(51) Int. Cl.
*C09K 8/22* (2006.01)
*E21B 21/00* (2006.01)

(52) U.S. Cl.
CPC ............... *C09K 8/22* (2013.01); *E21B 21/00* (2013.01)

(58) Field of Classification Search
CPC ................................. C09K 8/22; E21B 21/00
See application file for complete search history.

(56) References Cited

U.S. PATENT DOCUMENTS

| 7,384,892 | B2 | 6/2008 | Melbouci |
| 9,090,814 | B2 | 7/2015 | Armstrong et al. |
| 10,287,475 | B1 | 5/2019 | Pu |

| 2007/0015668 | A1 | 1/2007 | Harrower | |
| 2011/0308790 | A1* | 12/2011 | Strapoc | C12P 5/023 166/250.01 |
| 2015/0267105 | A1 | 9/2015 | Kremer et al. | |
| 2016/0376488 | A1 | 12/2016 | Galindo | |

FOREIGN PATENT DOCUMENTS

| CN | 109837073 A1 | 6/2019 |
| EP | 1862523 A1 | 12/2007 |

OTHER PUBLICATIONS

International Search Report and Written Opinion dated Jun. 25, 2020 for PCT Application PCT/US2019/054050 filed Oct. 1, 2019. 11 pages.

* cited by examiner

*Primary Examiner* — Frances Tischler
(74) *Attorney, Agent, or Firm* — Chamberlain Hrdlicka (57) ABSTRACT

A subterranean product extraction composition may include a borehole fluid that may include a thiamine based shale inhibitor active to inhibit reactivity of a formation shale to a base fluid of a borehole fluid. A method of extracting a subterranean product via a borehole may include providing a borehole fluid containing a thiamine-based shale inhibitor and inhibiting reactivity of a formation shale contacted with the borehole fluid. A system for extracting a subterranean product via a borehole may include a tubular having an end in proximity to a formation shale and in fluid communication with a container dispensing a borehole fluid containing a thiamine-based shale inhibitor. The thiamine-based shale inhibitor is inert to the borehole fluid and has superior activity as compared to potassium chloride to inhibit shale reactivity. The borehole fluid may be a drilling fluid. The base fluid may be water.

20 Claims, 2 Drawing Sheets

BOREHOLE FLUID WITH A THIAMINE-BASED SHALE INHIBITOR

BACKGROUND

The present disclosure relates to systems and methods for extracting a produced material from a subterranean formation that includes shale.

Operations to extract a subterranean product from the earth through a well often use borehole fluids to facilitate or implement the operations. Hydrocarbons, such as oil and gas, are subterranean products commonly extracted from reservoirs, areas of the earth that contain the hydrocarbons. A reservoir may be deep below the surface of the earth and the earth may include one or more formations that are above and/or make up the reservoir. A formation is a region of the earth with a distinct lithology describing the physical characteristics of the rock in the formation, such as mineral content. For example, a formation may include shale, a sedimentary rock which may include one or more materials that is reactive to water, such as by swelling upon contact with water.

Illustrative extraction operations may include, for example, drilling, completion, stimulation, and production. Stimulation operations may include, for example, fracturing and acidizing. In drilling, a drill bit is used to drill a borehole into the earth. A borehole fluid may be used with the drill bit to advance the borehole beneath the surface of the earth. For example, a drilling fluid, or "mud", may be circulated in the borehole with the drill bit to facilitate the drilling operation. As the drilling progresses it produces cuttings, which are small pieces of the formation through which the drill bit is progressing. The various functions of the drilling fluid include removing drilling cuttings from the borehole, cooling and lubricating the drill bit, aiding in support of the drill bit and the drill pipe which supports the drill bit, and providing a hydrostatic head to maintain the integrity of the borehole walls and prevent well blowouts.

During drilling of subterranean boreholes, various formations that include reactive shale may be encountered. Reactive shales may be problematic during drilling operations, for example, due to their tendency to transform when exposed to water-based drilling fluids, such as by swelling. The transformation of the shale may interfere with attempts to maintain the integrity of drilling cuttings traveling up the borehole until such time as the cuttings can be removed by solids control equipment located at or above the surface.

One technique used to counteract the propensity of water-based drilling fluids to interact with reactive shales in a formation involves the use of an additive that acts as a shale inhibitor. Potassium chloride is a common shale inhibitor. However, potassium chloride may be only moderately effective at inhibiting shale swelling in some cases. Further, in certain areas of the world, use of some shale inhibitors may be restricted, such as a restriction on potassium ions.

BRIEF DESCRIPTION OF THE DRAWINGS

Embodiments of the thiamine-based shale inhibitor and its use in drilling are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure relates to systems and methods for extracting a produced material from a subterranean formation that includes shale. More particularly, the present disclosure relates to a borehole fluid that includes a thiamine-based shale inhibitor and associated methods and systems.

The present disclosure provides a borehole fluid that may include a base fluid to which the shale is reactive and a thiamine-based shale inhibitor active to inhibit the reactivity of the shale to the base fluid. The borehole fluid may be a drilling fluid, a fracturing fluid, a drill-in fluid, a completion fluid, a workover fluid, an acidizing fluid, a suspension fluid, a breaker fluid, a packer fluid, a logging fluid, a spacer fluid, or other fluid suitable for hydrocarbon extraction operations using a thiamine-based shale inhibitor. The extraction operations may include exploration operations that do not result in a producing well. The base fluid may be water or other aqueous fluid or other base fluid to which the shale is reactive. The borehole fluid may include other additives suitable for use in the borehole fluid.

Among the potential advantages and benefits of the present disclosure, the thiamine-based shale inhibitor is inert to the borehole fluid and has activity to inhibit reactivity of shale to water. For example, the thiamine-based shale inhibitor may lack activity as a breaker when added to a borehole fluid containing a viscosifier. Further, the thiamine-based shale inhibitor may inhibit swelling of shale. Still further, the thiamine-based shale inhibitor may have superior activity as compared to potassium chloride to inhibit shale reactivity.

Reference throughout this specification to "include" means include, but is not limited to. Likewise, reference through this specification to "includes" means includes, but is not limited to.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

Unless otherwise indicated, a numerical parameter "n" expressing quantities used in the present disclosure and associated claims means "about n". Accordingly, unless otherwise indicated, reference to a numerical parameter in the specification and attached claims is an approximation that may vary depending upon the property the numerical parameter represents and the measurement method used to determine the property. For example, the approximation may be at least that of significant digits, with each numerical parameter given to not more than significant digits. For example, the appropriate number of significant digits associated with a measurement method is a baseline for the degree of approximation. For numerical parameters reported in alternative units ordinary rounding techniques are applied. For example, ° C. and ° F. are alternative units and kilogram (kg) and pound (lb) are alternative units.

Whenever a numerical range with a lower and upper limit is disclosed, any number and any included range falling within the range is specifically disclosed. In particular, every range of values is to be understood to set forth every number and range encompassed within the broader range of values. Reference to "from n to m" indicates a closed range [n,m]. Reference to "from n to less than m" indicates a half open range [n,m). Reference to "greater than n and up to m" indicates another half open range (n,m]. Reference to "greater than a and less than b" indicates an open range (n,m).

Shale may include one or more water-reactive minerals and shale inhibitors act to disrupt the reactivity of shale. When shale is exposed to water (e.g., an aqueous fluid; an aqueous-base fluid; a water-containing fluid, such as an emulsion; etc.), the clay in the shale can adsorb water and swell, thereby resulting in potential problems during drilling and/or completion processes, such as viscosity build-up, bit balling, wellbore caving, wellbore ballooning, subterranean formation integrity loss, collapse of subterranean formation, and the like. Shale is a clay-rich sedimentary rock, wherein the shale includes at least about 5 wt. % clay material, based on the total weight of the shale. Clay is a water-reactive mineral. Clay may include smectite, illite, kaolinite, chlorite, and combinations thereof. for purposes of the disclosure herein, the term "water-reactive" refers to formations (e.g., subterranean formations) and/or minerals thereof that can absorb water, uptake water, react with water, and the like, or combinations thereof. Water-reactive formations can encompass any subterranean formations containing clay or clay-based materials, such as shale. For purposes of the disclosure herein, the terms "shale inhibitor" and "clay inhibitor" can be used interchangeably and refer to chemical compounds having the ability to inhibit water uptake by clay-containing subterranean formations (i.e., water-reactive subterranean formations). Without wishing to be limited by theory, clay contains hydrous aluminum silicates having hydroxyl ions that are capable of forming hydrogen bonds.

The present disclosure includes thiamine-based compositions active as shale inhibitors that include thiamine, thiamine derivatives, anion compounds of thiamine, and combinations thereof. The thiamine in the thiamine-based shale inhibitor acts to disrupt reactivity of shale to water. While not wishing to be bound by theory, the shale inhibition activity of thiamine is believed to arise from the cationic amine character of thiamine.

Thiamine is a cationic, nitrogen rich vitamin (vitamin B1) and has been found to be active as shale inhibitor for borehole fluids. The structure of thiamine is:

Derivatives of thiamine are also contemplated as shale inhibitors. Suitable derivatives include thiamine monophosphate, thiamine diphosphate, and thiamine triphosphate.

The thiamine-based shale inhibitor may, be provided as a compound that includes an anion. The thiamine-based shale inhibitor may be provided as a compound that includes an anion. Suitable anions include chloride, bromide, acetate, formate, nitrate, and sulfate. Suitable compounds including chloride include thiamine chloride, thiamine monophosphate chloride, thiamine diphosphate chloride, thiamine triphosphate chloride, thiamine hydrochloride, thiamine monophosphate hydrochloride, thiamine diphosphate hydrochloride, and thiamine triphosphate hydrochloride. For example, the thiamine-based shale inhibitor may be provided as thiamine hydrochloride. Suitable compounds including bromide include thiamine bromide, thiamine monophosphate bromide, thiamine diphosphate bromide, thiamine triphosphate bromide, thiamine hydrobromide, thiamine monophosphate hydrobromide, thiamine diphosphate hydrobromide, and thiamine triphosphate hydrobromide. For example, the thiamine-based shale inhibitor may be provided as thiamine hydrobromide. Suitable compounds including acetate include thiamine monophosphate acetate, thiamine diphosphate acetate, and thiamine triphosphate actetate. Suitable compounds including formate include thiamine formate, thiamine monophosphate formate, thiamine diphosphate formate, and thiamine triphosphate formate. Suitable compounds including nitrate include thiamine nitrate, thiamine monophosphate nitrate, thiamine diphosphate nitrate, and thiamine triphosphate nitrate. Suitable compounds including sulfate include thiamine sulfate, thiamine monophosphate sulfate, thiamine diphosphate sulfate, and thiamine triphosphate sulfate.

The thiamine-based shale inhibitor may be provided as a compound that includes an anion. Suitable anions include chloride, bromide, acetate, formate, nitrate, and sulfate. Suitable compounds including chloride include thiamine chloride, thiamine monophosphate chloride, thiamine diphosphate chloride, thiamine triphosphate chloride, thiamine hydrochloride, thiamine monophosphate hydrochloride, thiamine diphosphate hydrochloride, and thiamine triphosphate hydrochloride. For example, the thiamine-based shale inhibitor may be provided as thiamine hydrochloride. Suitable compounds including bromide include thiamine bromide, thiamine monophosphate bromide, thiamine diphosphate bromide, thiamine triphosphate bromide, thiamine hydrobromide, thiamine monophosphate hydrobromide, thiamine diphosphate hydrobromide, and thiamine triphosphate hydrobromide. For example, the thiamine-based shale inhibitor may be provided as thiamine hydrobromide. Suitable compounds including acetate include thiamine monophosphate acetate, thiamine diphosphate acetate, and thiamine triphosphate actetate. Suitable compounds including formate include thiamine formate, thiamine monophosphate formate, thiamine diphosphate formate, and thiamine triphosphate formate. Suitable compounds including nitrate include thiamine nitrate, thiamine monophosphate nitrate, thiamine diphosphate nitrate, and thiamine triphosphate nitrate. Suitable compounds including sulfate include thiamine sulfate, thiamine monophosphate sulfate, thiamine diphosphate sulfate, and thiamine triphosphate sulfate.

Several different mechanisms may inhibit shale reactivity in subterranean formations, including but not limited to inhibition through charge interaction (e.g., using salts and amine based additives), blocking of pores in the formation matrix using inert materials (e.g., using nanomaterials) to prevent aqueous fluids from contacting shales in the formation, and/or at least partially encapsulating shale particles in order to at least partially stabilize shale particles and/or prevent their attrition and/or abrasion into smaller particles. Thus, the thiamine-based shale inhibitor may further include one or more additional shale inhibiting substances. As referenced herein, the phrase "inhibit shale reactivity", or variants thereof, refers to the action of one or more of these different inhibition mechanisms, either individually or collectively.

The disclosed thiamine-based shale inhibitor may be included in a borehole fluid for extraction operations, such as a drilling fluid. The shale inhibitor may be also inert in the borehole fluid until it interacts with shale. The shale inhibitor may also be inert to one or more of the following borehole components: viscosifier, filtration control additive, weight additive, additional salts, surfactants, acids, diverting agents, gas, nitrogen, carbon dioxide, surface modifying agents, tackifying agents, foamers, corrosion inhibitors, scale inhibitors, catalysts, clay stabilizers, shale inhibitors, biocides, friction reducers, antifoam agents, additional bridging agents, flocculants, $H_2S$ scavengers, $CO_2$ scavengers, oxygen scavengers, lubricants, hydrocarbons, breakers, relative permeability modifiers, resins, wetting agents, coating enhancement agents, filter cake removal agents, antifreeze agents (e.g., ethylene glycol), particulates, and the like.

The borehole fluid may a fracturing fluid. In the fracturing fluid, the shale inhibitor may be a shale stabilizer.

The borehole fluid may include any base fluid known in the art, including aqueous base fluids, non-aqueous base fluids, and any combinations thereof. Generally, the base fluid is aqueous and the borehole fluid is water-based. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. The aqueous fluid may include one or more ionic species, such as those formed by salts dissolved in water. For example, seawater and/or produced water may include a variety of divalent cationic species dissolved therein. The density of the aqueous fluid may be adjusted, among other purposes, to provide additional particulate transport and suspension in the compositions of the present disclosure. The pH of the aqueous fluid may be adjusted (e.g., by a buffer or other pH adjusting agent) to a specific level, which may depend on, among other factors, the types of viscosifiers, and other additives included in the fluid. One of ordinary skill in the art, with the benefit of this disclosure, will recognize when such density and/or pH adjustments are appropriate. The borehole fluid may include a mixture of one or more aqueous fluids with other fluids and/or gases, including but not limited to emulsions, foams, and the like.

The shale inhibitor may be provided in a borehole fluid in any suitable amount. The shale inhibitor may be included in the borehole fluid in an active concentration of from 0.1 pounds per barrel (lb/bbl) to 20 lb/bbl. The shale inhibitor may be included in the borehole fluid in an active concentration of from 0.5 lb/bbl to 15 lb/bbl. The shale inhibitors may be included in the borehole fluid in an active concentration of from 1 lb/bbl to 10 lb/bbl. A person of skill in the art with the benefit of this disclosure will recognize suitable amounts of the shale inhibitor to include in a borehole fluid of the present disclosure based on, among other things, the amount and/or reactivity of shale in the formation, other components of the borehole fluid (e.g., brines), and other parameters of the operation in which the borehole fluid will be used.

The borehole fluid may also include one or more viscosifiers. When a fluid is broken, the fluid has an amount of viscosification similar to that without the viscosifier. The viscosifiers may be included in the borehole fluid in an active concentration of from 0.1 pounds per barrel (lb/bbl) to 20 lb/bbl. The viscosifiers may be included in the borehole fluid in an active concentration of from 0.25 lb/bbl to 10 lb/bbl. In some embodiments, the viscosifiers may be included in the borehole fluid in an active concentration of from 0.5 lb/bbl to 8 lb/bbl.

As an example of observed inert character of thiamine-based shale inhibitors, it has been found that thiamine does not break water-based borehole fluids. Thus, the present thiamine-based shale inhibitor does not act as a breaker. Generally, a breaker is used to degrade or dissolve a component in a fluid. For example, breaking the fluid may refer to polymer degradation or dissolving solid particulates. A breaker degrades a component by breaking up chemical bonds.

The borehole fluid may also contain one or more filtration control additives. The weight additives may be included in a borehole fluid in any amount needed to impart the desired properties to the fluid. The filtration control additives may be included in the borehole fluid in an active concentration of from 0.1 pounds per barrel (lb/bbl) to 20 lb/bbl. The filtration control additives may be included in the borehole fluid in an active concentration of from 0.2 lb/bbl to 18 lb/bbl. The filtration control additives may be included in the borehole fluid in an active concentration of from 0.3 lb/bbl to 15 lb/bbl.

The borehole fluid may include one or more weight additives, among other purposes, to provide a borehole fluid of the desired weight and/or density for the subterranean formation in which it is used. Examples of weight additives that may be suitable include barites (barium sulfate), hematite, iron ores, siderite, ilmenite, galena, carbonates (e.g., calcium carbonate, magnesium carbonate, iron carbonate, zinc carbonate), manganese tetraoxide, chloride salts (e.g., NaCl, KCl, $CaCl_2$), formate salts, and any combination thereof. These weight additives may be at least partially soluble or insoluble in the borehole fluid. The weight additives may be included in a borehole fluid in any amount needed to impart the desired properties to the fluid. Low density fluids require lower amounts of weighting agents and high density fluid require higher amounts of weighting agent.

The borehold fluid may include one or more pH-adjusting additive. The pH-adjusting additive may be included in a borehole fluid in any amount needed to impart the desired pH to the fluid. Examples of pH-adjusting additives that may be suitable include soda ash, sodium bicarbonate, calcium hydroxide, sodium hydroxide. The pH-adjusting additives may be included in the borehole fluid in an active concentration of from 0.01 pounds per barrel (lb/bbl) to 10 lb/bbl. The pH-adjusting additives may be included in the borehole fluid in an active concentration of from 0.02 lb/bbl to 9 lb/bbl. The pH-adjusting additives may be included in the borehole fluid in an active concentration of from 0.03 lb/bbl to 8 lb/bbl.

The drilling fluid may be on the alkaline side of neutral pH, for example as it goes downhole. The pH may be from 7.5 to 13. The pH may be from 8 to 12.5. The pH may be from 8 to 12.

The borehole fluid optionally may include any number of additional additives. Examples of such additional additives include, but are not limited to, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional shale inhibitors, $H_2S$ scavengers, $CO_2$ scavengers, oxygen scavengers, lubricants, viscosifiers, breakers, weight additives, relative permeability modifiers, resins, wetting agents, coating enhancement agents, filter cake removal agents, antifreeze agents (e.g., ethylene glycol), and the like. One or more of these additional additives may be added to the borehole fluid and/or activated after the viscosifier has been at least partially hydrated in the fluid. A person skilled in the art, with the benefit of this disclosure, will recognize the types of additives that may be included in the fluids of the present disclosure for a particular application.

The borehole fluids of the present disclosure may be prepared using any suitable method and/or equipment (e.g., blenders, mixers, stirrers, etc.) known in the art at any time prior to their use. The borehole fluids may be prepared at least in part at a well site or at an offsite location. In certain embodiments, the shale inhibitor and/or other components of the borehole fluid may be metered directly into a base borehole fluid to form a borehole fluid. In certain embodiments, the base fluid may be mixed with the shale inhibitor and/or other components of the borehole fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going operation. Such mixing can also be described as "real-time" mixing. In other embodiments, the borehole fluids of the present disclosure may be prepared, either in whole or in part, at an offsite location and transported to the site where the operation is conducted. In introducing a borehole fluid of the present disclosure into a portion of a subterranean formation, the components of the borehole fluid may be mixed together at the surface and introduced into the formation together, or one or more components may be introduced into the formation at the surface separately from other components such that the components mix or intermingle in a portion of the formation to form a borehole fluid. In either such case, the borehole fluid is deemed to be introduced into at least a portion of the subterranean formation for purposes of the present disclosure.

A method of extracting a subterranean product via a borehole may include placing a borehole fluid containing a base fluid and a thiamine-based shale inhibitor in the borehole, contacting the borehole fluid with shale in a formation, and inhibiting reactivity of the shale to the base fluid with the thiamine-based shale inhibitor.

A method of extracting a subterranean product may include providing a borehole fluid including a thiamine-based shale inhibitor, introducing the borehole fluid into at least a portion of a subterranean formation to contact at least a portion of the subterranean formation that includes shale, and allowing the shale inhibitor to interact with the shale in the subterranean formation to at least partially inhibit reactivity of the shale.

The borehole fluid may be used to carry out a variety of subterranean extraction operations. The borehole fluid may be a drilling fluid and the drilling fluid may be introduced into at least a portion of a borehole as it is drilled to penetrate at least a portion of a subterranean formation. The drilling fluid may be circulated in the well bore during drilling, among other reasons, to cool and/or lubricate a drill bit and/or drill pipe to prevent them from sticking to the walls of the borehole, prevent blowouts by serving as a hydrostatic head to counteract the sudden entrance into the well bore of high pressure formation fluids, suspend or remove formation cuttings from the well bore, and/or enhance the stability of the well bore during drilling.

Figure 1:
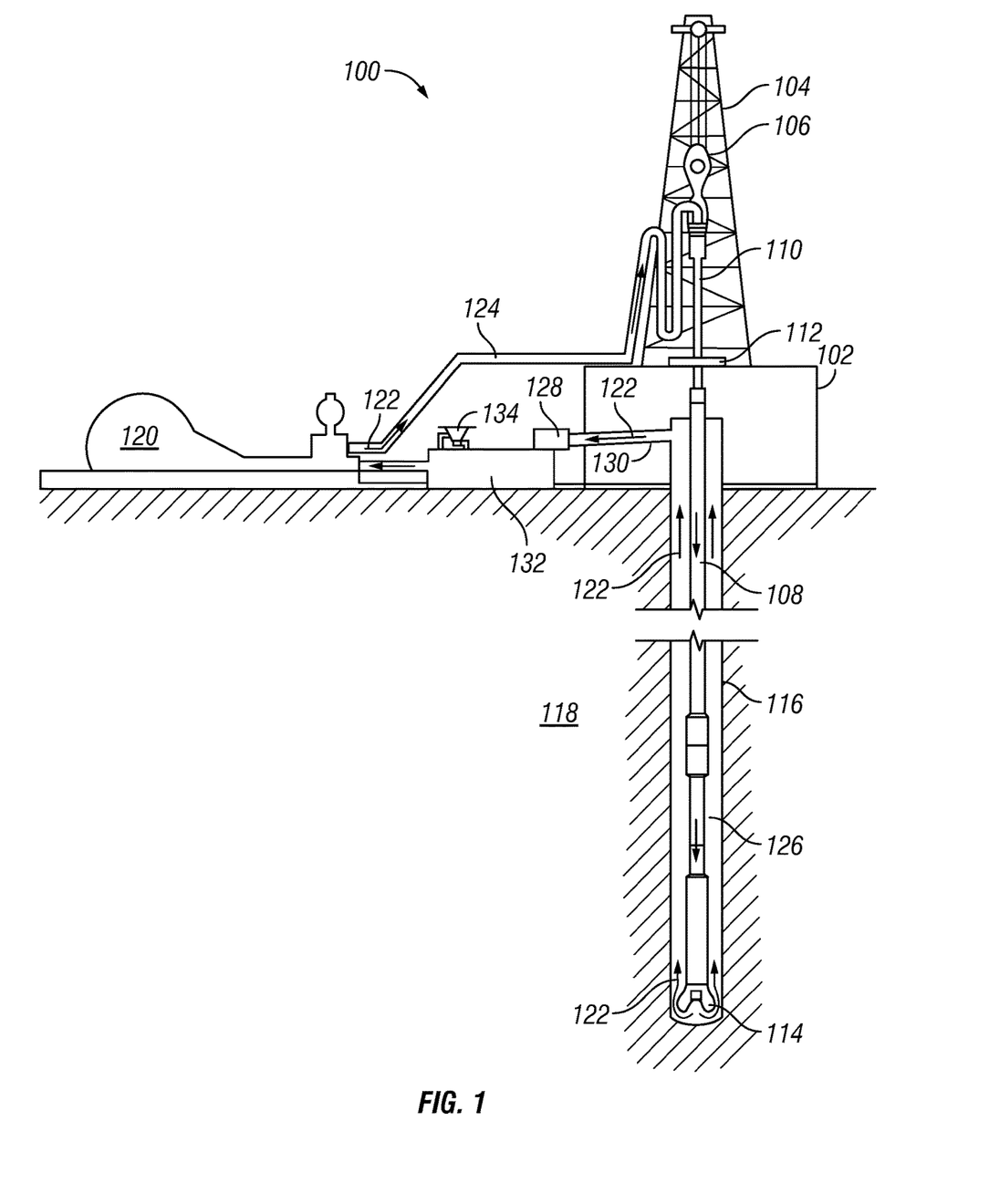
FIG. 1 is a diagram of an onshore well system, according to one or more embodiments.

FIG. 1 is a diagram of an onshore well system 100 that includes a drilling platform 102 that supports a derrick 104 having a traveling block 106 for raising and lowering a drill string 108. The drill string 108 may include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118. The drill string 108 is illustrative of a tubular. One skilled in the art will appreciate that other configurations of a well system 100 may also be used.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and is conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the borehole 116 via the annulus 126, those skilled in the art will readily appreciate that the fluid processing unit(s) 128 may be arranged at any other location in the drilling assembly 100 to facilitate its proper function, without departing from the scope of the scope of the disclosure.

The shale inhibitor may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively or in combination, the disclosed shale inhibitor may be added to the drilling fluid 122 at any other location in the drilling assembly 100. For example, there could be more than one retention pit 132, such as multiple retention pits 132 in series. Moreover, the retention pit 132 may be representative of one or more fluid storage facilities and/or units where the disclosed shale inhibitor may be stored, reconditioned, and/or regulated until added to the drilling fluid 122. Retention pit 132 is illustrative of a container.

The fluid processing unit(s) 128 may include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the shale inhibitor.

The pump 120 representatively includes any conduits, pipelines, trucks, tubulars, and/or pipes used to fluidically convey the borehole fluid downhole, any pumps, compressors, or motors (e.g., topside or downhole) used to drive the borehole fluid into motion, any valves or related joints used to regulate the pressure or flow rate of the borehole fluid, and any sensors (i.e., pressure, temperature, flow rate, etc.), gauges, and/or combinations thereof, and the like.

The drill bit 114 may include roller cone bits, PDC bits, natural diamond bits, any hole openers, reamers, coring bits, etc. There may be floats, drill collars, mud motors, downhole motors and/or pumps associated with the drill string 108. There may be MWD/LWD tools and related telemetry equipment, sensors or distributed sensors associated with the drill string 108. There may be downhole heat exchangers, valves and corresponding actuation devices, tool seals, packers and other borehole isolation devices or components, and the like associated with the borehole 116.

Figure 2:
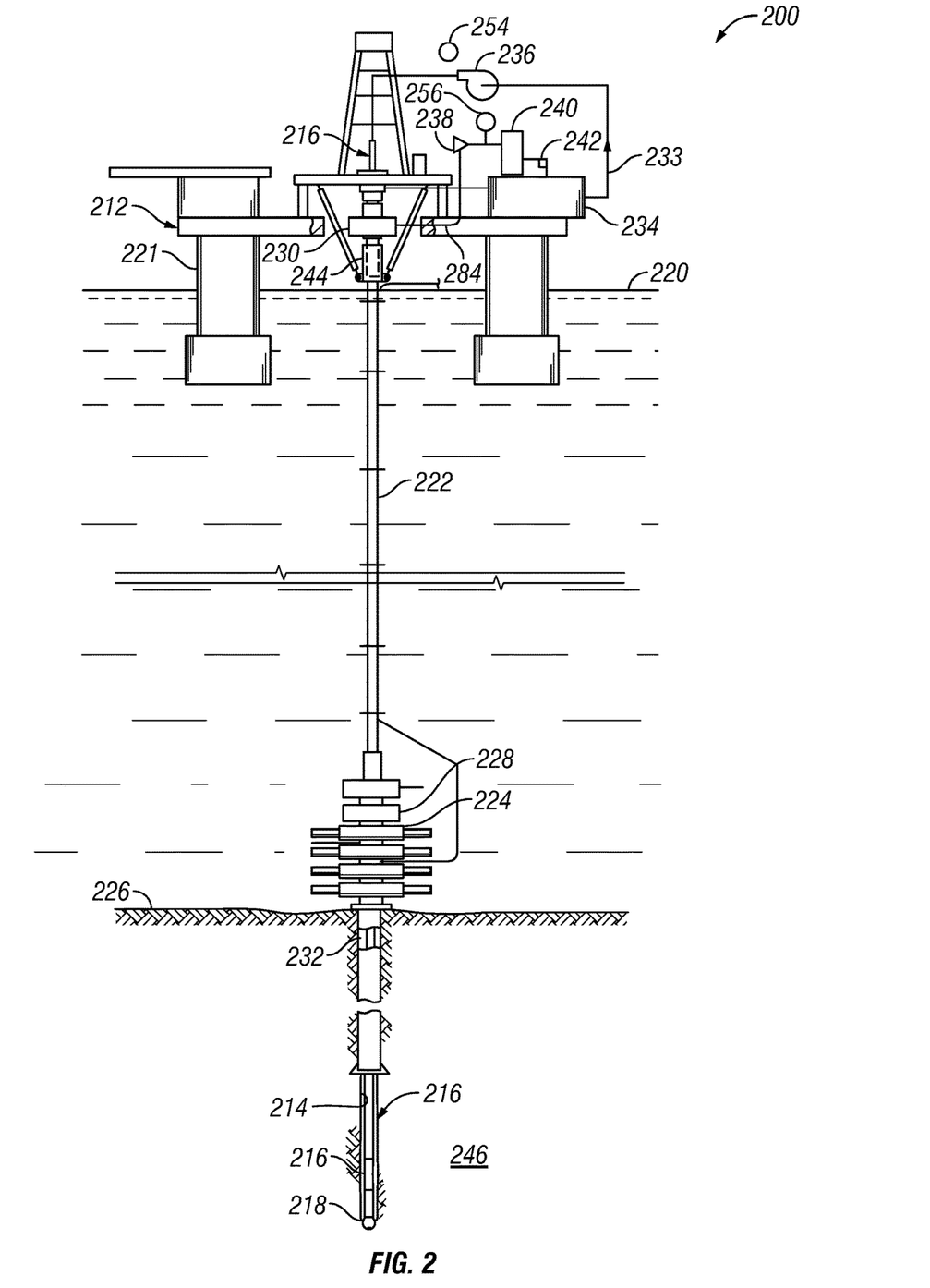
FIG. 2 is a diagram of an offshore well system, according to one or more embodiments.

FIG. 2 is a diagram of an offshore well system. Representatively illustrated in FIG. 2 is a system 200 for drilling a well, and an associated method, which system and method can embody principles of this disclosure. However, it should be clearly understood that the system 200 and method are merely one example of an application of the principles of this disclosure in practice, and a wide variety of other examples are possible. Therefore, the scope of this disclosure is not limited at all to the details of the system 200 and method described herein and/or depicted in the drawings.

In the well system 200 depicted in FIG. 2, a floating rig 212 including a floating vessel 221 is used to drill a borehole 214 in formation 246. A generally tubular drill string 216 has a drill bit 218 connected at a lower end thereof, and the drill bit is rotated and/or otherwise operated to drill the borehole 214. The floating vessel 221 is positioned at a surface location 220.

In FIG. 2, a marine riser 222 extends between the rig 212 and a blowout preventer stack 224 positioned at a subsea location (e.g., at a mud line or on a seabed 226). The riser 222 serves as a conduit for guiding the drill string 216 between the rig 212 and the blowout preventer stack 224, for flowing fluids between the rig and the borehole 214, etc. The floating vessel 221 is connected to the marine riser 222 via a telescoping joint 244 (also known as a sliding joint or a slip joint), in order to accommodate vertical motion of the vessel 221 due to wave and tide influence.

Interconnected between the riser 222 and the blowout preventer stack 224 is an annular blowout preventer 228. The annular blowout preventer 228 is designed to seal off an annulus 232 about the drill string 216 in certain situations (e.g., to prevent inadvertent release of fluids from the well in an emergency, etc.), although a typical annular blowout preventer can seal off the top of the blowout preventer stack 224 even if the drill string is not present in the annular blowout preventer. Near an upper end of the riser 222 is an annular sealing device 230, which is also designed to seal off the annulus 232 about the drill string 216.

Drilling fluid 233 is contained in a reservoir 234 of the rig 212. A rig pump 236 is used to pump the drilling fluid 233 into the drill string 216 at the surface. The drilling fluid flows through the drill string 216 and into the borehole 214 (e.g., exiting the drill string at the drill bit 218). The reservoir 234 is illustrative of a container and the drill string 216 is illustrative of a tubular.

The shale inhibitor may be added to the drilling fluid 233 via reservoir 234 or another container, such as a mixing hopper (not shown) communicably coupled to or otherwise in fluid communication with the reservoir 234. The mixing hopper may include, but is not limited to, mixers and related mixing equipment known to those skilled in the art. Alternatively or in combination, the disclosed shale inhibitor may be added to the drilling fluid 233 at any other location in the floating rig 212. For example, there could be more than one reservoir 234, such as multiple reservoirs 234 in series. Moreover, the reservoirs 234 may be representative of one or more fluid storage facilities and/or units where the disclosed shale inhibitor may be stored, reconditioned, and/or regulated until added to the drilling fluid 223. Reservoir 234 is illustrative of a container.

The drilling fluid 233 then exits the drill bit 218 and flows through the annulus 232 back to the reservoir 234 via a choke manifold 238, a gas buster or "poor boy" degasser 240, a solids separator 242, etc. Measurements of flow rate into the well and flow rate from the well could be obtained, for example, by use of flowmeters 254, 256. However, it should be understood that other types and combinations of drilling fluid handling, conditioning and processing equipment may be used within the scope of this disclosure.

A pressure control system (not shown) can be used to control pressure in the borehole 214. The pressure control system can operate the choke manifold 238, so that a desired amount of backpressure is applied to the annulus 232. The pressure control system may regulate operation of other equipment (e.g., the pump 236, a standpipe control valve, a diverter which diverts flow from the pump 236 to a drilling fluid return line 284 upstream of the choke manifold 238, etc.), as well.

Certain embodiments may include providing a subterranean product extraction composition that may include a borehole fluid that may include a base fluid and thiamine based shale inhibitor active to inhibit reactivity of formation shale to the base fluid.

Certain embodiments may include placing a borehole fluid containing a base fluid and a thiamine-based shale inhibitor in a borehole; contacting the borehole fluid with shale in a formation; and inhibiting reactivity of the shale to the base fluid with the thiamine-based shale inhibitor.

Certain embodiments may include a tubular disposed in the borehole, wherein the tubular is in fluid communication with a fluid container and has an end in proximity to shale in a formation; and a borehole fluid dispensed from the fluid container, wherein the borehole fluid comprises a base fluid to which the shale is reactive and a thiamine-based shale inhibitor.

In certain embodiments, the thiamine-based shale inhibitor includes a cationic amine. In certain embodiments, the thiamine-based shale inhibitor includes one or more of thiamine, thiamine derivatives, and combinations thereof. In certain embodiments, the thiamine-based shale inhibitor includes one of thiamine and a thiamine derivative. In certain embodiments, the thiamine-based shale inhibitor includes an anion. In certain embodiments, the thiamine-based shale inhibitor includes thiamine hydrochloride. In certain embodiments, the thiamine-based shale inhibitor is thiamine hydrochloride.

In certain embodiments, the base fluid includes water. In certain embodiments, the base fluid is water. In certain embodiments, the borehole fluid includes a drilling fluid. In certain embodiments, the borehole fluid is a drilling fluid. In certain embodiments, the borehole fluid includes a water-based drilling fluid. In certain embodiments, the borehole fluid is a water-based drilling fluid. In certain embodiments, the borehole fluid includes a fracturing fluid. In certain embodiments, the borehole fluid is a fracturing fluid. In certain embodiments, the borehole fluid includes a water-based fracturing fluid. In certain embodiments, the borehole fluid is a water-based fracturing fluid.

In certain embodiments, the shale includes one or more water-reactive minerals. The one or more water-reactive minerals may include clay. The clay may include one or more of smectite, illite, kaolinite, chlorite, and combinations thereof.

In certain embodiments, the tubular comprises a drill string supporting a drill bit.

Certain embodiments may include any one or more of the above embodiments in combination.

To facilitate a better understanding of the present disclosure the following non-limiting examples are given.

EXAMPLES

Thiamine was tested to determine its shale inhibition properties and compatibility with drilling fluids. Thiamine is illustrative of an environmentally-friendly shale inhibitor. The data is provided in the following examples. The sample fluids of Example 1 are illustrative of water-based drilling fluids to which bentonite has been added. The sample fluids of Example 2 are illustrative of whole muds, which are illustrative of water-based drilling fluids. Compatibility with drilling fluids is illustrated by an absence of breaking activity of the thiamine.

Example 1

This example illustrates shale inhibition activity of thiamine and compatibility with a viscosifier-containing fluid. The results of testing show that thiamine hydrochloride outperforms potassium chloride as a shale inhibitor as observed in bentonite hydration suppression testing using rheology testing and as observed in free water breakout testing and settling of solids testing by using visual inspection of the same samples used in the bentonite hydration suppression testing. Bentonite is illustrative of clay which is in turn illustrative of shale. Hydration of the bentonite is illustrative of reactivity of the bentonite with water. Suppression of bentonite hydration, free water breakout, and settling of solids are illustrative of inhibition of bentonite reactivity.

Sample Preparation

Seven samples of fluid were prepared. Each sample had a composition including 350 mL DI water, and 20 g of AQUAGEL GOLD SEAL® viscosifier. AQUAGEL GOLD SEAL® is available commercially from Halliburton. AQUAGEL GOLD SEAL® contains sodium bentonite free of polymers and was the source of bentonite for the testing. The seven samples had the amounts of potassium chloride, thiamine hydrochloride, and pH given in Table 1. Aquagel gold seal was added last to all of the fluids. Therefore each fluid represented a unique make-up water that the same amount of bentonite was hydrated in. Fluids 5 and 7 were adjusted to a pH of 8 with soda ash before bentonite was introduced to the fluid. This was done to ensure the hydration suppression effects were not caused simply by an acidic fluid. The testing was rheology testing and observation of free water breakout and settling of solids.

TABLE 1

| Sample | Potassium chloride (g) | Thiamine hydrochloride (g) |
|---|---|---|
| 1 | — | — |
| 2 | 1 | — |
| 3 | 5 | — |
| 4 | — | 1 |
| 5* | — | 1 |
| 6 | — | 5 |
| 7* | — | 5 |

*Fluids 5 and 7 were adjusted to a pH of 8 with soda ash

Rheology Testing

The rheology testing illustrates inhibition of clay swelling. Bentonite clay has a structure of stacked platelets. Bentonite clay viscosities fresh water via exfoliation of clay platelets. If the clay cannot swell, it cannot exfoliate. If the clay cannot exfoliate, it cannot viscosify. If the swelling is inhibited the platelets remain stacked.

Rheology testing at 21° C. (70° F.) and atmospheric pressure was conducted using a FANN Model 45 Viscometer. To test a sample, a portion of the sample was placed in a cylindrical container. The viscometer has a spinning spindle that can spin the container at a controlled rpm. Each rpm produces a different shear rate. The viscometer was programed for a sequence of 600 rpm, 300 rpm, 200 rpm, 100 rpm, 6 rpm, 3 rpm, 10 sec gel, 10 min gel, and 30 min gel. At each rpm the cylinder is spun for a minute. The dial goes up and down. The maximum inflection is recorded as the dial reading. The dial readings for each stage of the sequence were noted and are given in Table 2. The dial reading measurement is an angle of deflection which can be converted to centipoise (cP) of viscosity. The conversion factor does not depend on viscosity. Viscosity values are given in Table 3. In the sequence, after 3 rpm, for the 10 sec gel reading, the cylinder is spun at 600 rpm for 1 minute, then there is a time interval of 10 sec where the fluid is held in a static condition, then the cylinder is spun at 3 rpm for 1 minute and the reading taken. For the 10 min gel measurement the process is repeated but with a time interval of 10 min, and likewise for the 30 min gel measurement. The data in Table 2 show that thiamine is capable of significantly suppressing the hydration of sodium bentonite. As a benchmark, data for potassium as a hydration suppressant is provided. A comparison of the results for samples 4 and 5 to the results for sample 3 shows that thiamine outperforms potassium as a hydration suppressant. In particular, the fluids containing thiamine achieve a similar rheological profile to the fluid containing potassium, using a smaller amount of thiamine as compared to potassium.

TABLE 2

| Sample | Dial reading at 21° C. [70° F.] | | | | | | Gel Strength, lb/100 ft² | | |
|---|---|---|---|---|---|---|---|---|---|
| | 600 rpm | 300 rpm | 200 rpm | 100 rpm | 6 rpm | 3 rpm | 10 sec gel | 10 min gel | 30 min gel |
| 1 | 32 | 25 | 23 | 21 | 19 | 19 | 25 | 42 | 50 |
| 2 | 26 | 21 | 19 | 17 | 14 | 14 | 18 | 27 | 32 |
| 3 | 10 | 7 | 6 | 5 | 3 | 3 | 4 | 7 | 8 |
| 4 | 9 | 6 | 5 | 3 | 2 | 2 | 3 | 4 | 5 |
| 5 | 13 | 9 | 8 | 6 | 5 | 5 | 7 | 10 | 11 |
| 6 | 8 | 5 | 4 | 3 | 1 | 1 | 1 | 1 | 1 |
| 7 | 10 | 7 | 6 | 5 | 3 | 2 | 2 | 3 | 3 |

TABLE 3

| Sample | Viscosity (cP) at at 21° C. [70° F.] | | | | | |
|---|---|---|---|---|---|---|
| | 600 rpm | 300 rpm | 200 rpm | 100 rpm | 6 rpm | 3 rpm |
| 1 | 16.0 | 25.0 | 34.5 | 63.0 | 950.0 | 1900.0 |
| 2 | 13.0 | 21.0 | 28.5 | 51.0 | 700.0 | 1400.0 |
| 3 | 5.0 | 7.0 | 9.0 | 15.0 | 150.0 | 300.0 |
| 4 | 4.5 | 6.0 | 7.5 | 9.0 | 100.0 | 200.0 |
| 5 | 6.5 | 9.0 | 12.0 | 18.0 | 250.0 | 500.0 |
| 6 | 4.0 | 5.0 | 6.0 | 9.0 | 50.0 | 100.0 |
| 7 | 5.0 | 7.0 | 9.0 | 15.0 | 150.0 | 200.0 |

Observation of Free Water Breakout and Settling of Solids

The sample fluids 1-7 created for the bentonite hydration testing were each placed in a glass jar in an amount of 350 mL and observed visually after a waiting period of 16 hours. In addition to the rheology measured for these fluids, provided in Table 2, the visual inspection can give further indication of how stable/unstable the fluids are by observation of free water breakout and settling of solids (characteristic of an unstable fluid). When a sample was first place in the jar the solids were suspended in the fluid. After the waiting period the amount of a free water breakout ("free") portion and a settled portion in the fluid were observed visually through the jar. Table 3 lists the characterizations of the amounts of settling visible for the sample fluids. The results in Table 4 show that the thiamine-containing fluid experience greater separation into a free portion and a settled portion. This indicates that thiamine is a superior shale inhibitor to potassium.

TABLE 4

| Sample | 1 | 2 | 3 | 4 | 5 | 6 | 7 |
|---|---|---|---|---|---|---|---|
| Settling | no | no | moderate | minor | minor | high | high |
| Free | 0% | 0% | 30% | 10% | 10% | 60% | 50% |
| Settled | 100% | 100% | 70% | 90% | 90% | 40% | 50% |

Example 2

This example illustrates shale inhibition activity of thiamine when the thiamine is in a drilling fluid and compatibility of thiamine with the drilling fluid. The results of testing show that a thiamine-containing fluid achieves better shale recovery than a potassium-containing fluid with a similar rheological profile, as observed in whole mud rheology testing and shale erosion testing. The results further show that thiamine does not break the drilling fluid London clay is illustrative of clay which is in turn illustrative of shale. Suppression of London clay hydration and shale recovery, as observed in the shale erosion testing, are illustrative of inhibition of clay reactivity. The whole muds are illustrative drilling fluids. Xanthan is illustrative of a viscosifier. Dextrid® E™ and PAC-L™ are illustrative of filtration control additives, and barite is illustrative of a weight additive. In commercial drilling fluids, PAC-L™ complements Dextrid® E™. Field experience suggests a pH of 8-10 is desirable, but not a requirement.

Sample Preparation

Three sample whole muds were prepared. Each sample had a composition including (294 g) of tap water, (1.25 g) of xanthan, (5 g) of Dextrid® E™, (2 g) of PAC-L™, and (97 g) of barite. Dextrid® E™ and PAC-L™ are available commercially from Halliburton. The pH was not measured. The three samples had the amounts of potassium chloride, thiamine hydrochloride, and soda ash given in Table 5. The rheology for each fluid was tested at 49° C. (120° F.). Following rheology testing, each sample received 20 g of London clay with a particle size of 2-4 mm for shale erosion testing.

TABLE 5

| Sample | KCl [g] | Thiamine HCl [g] | Soda Ash [g] |
|---|---|---|---|
| 8 | 5 | — | 0.5 |
| 9 | — | 5 | 0.5 |
| 10 | — | 5 | 1.25 |

Rheology Testing

Whole mud rheology testing was conducted using same instrument and pressure setting as the rheology testing in Example 1. The temperature was 49° C. (120° F.). No clay was used in this rheology test. The London clay is only introduced after the rheology test to conduct the shale erosion test. As a benchmark, data for potassium as a hydration suppressant is provided. The results given in Table 5 show that sample whole muds 9 and 10 which were thiamine-containing had a similar rheological profile to sample whole mud 8 which was potassium-containing. The 10 sec gel, 10 min gel, and 30 min gel numbers for each sample in Table 6 are pretty flat. Table 7 gives the results for viscosity. The results for samples 9 and 10 show that thiamine does not break the drilling fluid. More specifically, it shows, at least under these standard conditions, the thiamine is not degrading the polymer viscosfiers (xanthan, dextrid and PAC). Sample whole mud 10 had a higher pH than sample whole mud 9 due to containing a higher amount of soda ash. This was done to ensure the hydration suppression effects were not caused simply by an acidic fluid. The pH was not measured.

TABLE 6

| | Dial reading at 49° C. [120° F.] | | | | | | | | |
|---|---|---|---|---|---|---|---|---|---|
| Sample | 600 rpm | 300 rpm | 200 rpm | 100 rpm | 6 rpm | 3 rpm | 10 sec gel | 10 min gel | 30 min gel |
| 8 | 51 | 35 | 28 | 21 | 8 | 7 | 8 | 10 | 10 |
| 9 | 54 | 39 | 31 | 22 | 8 | 7 | 10 | 11 | 11 |
| 10 | 51 | 37 | 30 | 22 | 8 | 7 | 10 | 12 | 12 |

TABLE 7

| | Viscosity (cP) at at 49° C. [120° F.] | | | | | |
|---|---|---|---|---|---|---|
| Sample | 600 rpm | 300 rpm | 200 rpm | 100 rpm | 6 rpm | 3 rpm |
| 8 | 25.5 | 35.0 | 42.0 | 63.0 | 400.0 | 700.0 |
| 9 | 27.0 | 39.0 | 46.5 | 66.0 | 400.0 | 700.0 |
| 10 | 25.5 | 37.0 | 45.0 | 66.0 | 400.0 | 700.0 |

Shale Erosion Testing

Shale erosion testing was conducted. The material representative of shale cuttings ("shale material") used for the testing was London clay with a particle size of 2-4 mm. The clay was sized between a first No. 5 screen and a second No. 10 screen. 20 gm of sized clay was combined with 350 mL of the whole mud in a jar and hot-rolled at 65.6° C. (150° F.) for 16 hours. The resulting material was then collected on the second screen, washed, and dried. The percent shale recovery is the ratio of the weight of the dried resulting material to the weight of the shale material that was added to the jar. The results in Table 8 show that two thiamine-containing fluids (Samples 9 and 10) achieves better shale recovery than a potassium-containing fluid (Sample 8) with a similar rheological profile. The % recovery can be higher than 100% because there may be additional materials in the resulting material, for example adsorbed polymers, salts, or barite. A number greater than 100% is considered effectively 100% recovery of the shale material.

TABLE 8

| Sample | 8 | 9 | 10 |
|---|---|---|---|
| Shale recovery (%) | 89.7 | 105.6 | 101.0 |

One or more specific embodiments have been described. The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method of drilling a borehole in a reactive shale formation comprising:
   placing a drilling fluid containing a base fluid to which the shale formation is reactive and a thiamine-based shale inhibitor in the borehole;
   contacting the drilling fluid with shale in the formation; and
   at least partially encapsulating the shale with the thiamine-based shale inhibitor to inhibit reactivity of the shale to the base fluid.

2. The method of claim 1, wherein the thiamine-based shale inhibitor comprises a cationic amine.

3. The method of claim 2, wherein the thiamine-based shale inhibitor is selected from the group consisting of thiamine, thiamine derivatives, and combinations thereof.

4. The method of claim 3, wherein the thiamine-based shale inhibitor is selected from the group consisting of thiamine, thiamine monophosphate, thiamine diphosphate, thiamine triphosphate, and combinations thereof.

5. The method of claim 3, wherein the thiamine-based shale inhibitor comprises an anion.

6. The method of claim 5, wherein the anion is selected from the group consisting of chloride, bromide, acetate, formate, nitrate, sulfate, and combinations thereof.

7. The method of claim 6, wherein the thiamine-based shale inhibitor comprises thiamine hydrochloride.

8. The method of claim 1, wherein the base fluid comprises water.

9. The method of claim 1, wherein the shale comprises bentonite, the thiamine-based shale inhibitor comprises thiamine hydrochloride, the base fluid comprises water, and wherein the inhibiting comprises inhibiting reactivity of the shale to the water with the thiamine hydrochloride.

10. The method of claim 1, wherein the thiamine-based shale inhibitor is inert to the base fluid.

11. The method of claim 1, wherein at least partially encapsulating the shale with the thiamine-based shale inhibitor further comprises preventing viscosity build-up, bit balling, borehole caving, borehole ballooning, subterranean formation integrity loss, collapse of subterranean formation, and combinations thereof.

12. The method of claim 1, further comprising inhibiting reactivity of the shale to the base fluid through charge interactions between the shale and the thiamine-based shale inhibitor.

13. The method of claim 1, further comprising inhibiting reactivity of the shale to the base fluid by blocking pores in the formation with inert materials to prevent the base fluid from contacting the shale.

14. The method of claim 1, wherein the drilling fluid comprises a fracturing fluid and the thiamine-based shale inhibitor is a thiamine-based shale stabilizer.

15. The method of claim 1, wherein the drilling fluid comprises the thiamine-based shale inhibitor at a concentration between about 0.1 and about 20 pounds per barrel.

16. The method of claim 1, further comprising adding the thiamine-based shale inhibitor to the drilling fluid via a mixing hopper.

17. The method of claim 16, wherein the step of adding the thiamine-based shale inhibitor to the drilling fluid via the mixing hopper is performed before the step of placing the drilling fluid containing the base fluid and the thiamine-based shale inhibitor in the borehole.

18. The method of claim 1, wherein at least partially encapsulating the shale with the thiamine-based shale inhibitor comprises forming hydrogen bonds with hydroxyl ions in the shale.

19. The method of claim 1, wherein the thiamine-based shale inhibitor is inert to the drilling fluid.

20. The method of claim 19, wherein the drilling fluid comprises a viscosifier and the thiamine-based shale inhibitor is inert to the viscosifier.

* * * * *